United States Patent
Zhang et al.

(10) Patent No.: US 12,156,132 B2
(45) Date of Patent: Nov. 26, 2024

(54) STATE DETERMINING METHOD, STATE INDICATION METHOD, COMMUNICATION DEVICE, COMMUNICATION SYSTEM, AND STORAGE MEDIUM

(71) Applicant: ZTE CORPORATION, Shenzhen (CN)

(72) Inventors: Chenchen Zhang, Shenzhen (CN); Peng Hao, Shenzhen (CN); Xing Liu, Shenzhen (CN); Xianghui Han, Shenzhen (CN); Yachao Liang, Shenzhen (CN); Haigang He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 468 days.

(21) Appl. No.: 17/267,529

(22) PCT Filed: Aug. 12, 2019

(86) PCT No.: PCT/CN2019/100148
§ 371 (c)(1),
(2) Date: Feb. 10, 2021

(87) PCT Pub. No.: WO2020/030169
PCT Pub. Date: Feb. 13, 2020

(65) Prior Publication Data
US 2021/0160775 A1    May 27, 2021

(30) Foreign Application Priority Data
Aug. 10, 2018    (CN) .......................... 201810911007.7

(51) Int. Cl.
*H04L 1/00*    (2006.01)
*H04L 5/00*    (2006.01)
(Continued)

(52) U.S. Cl.
CPC ....... *H04W 52/0216* (2013.01); *H04L 1/0003* (2013.01); *H04L 5/0007* (2013.01);
(Continued)

(58) Field of Classification Search
CPC . H04L 1/0001–248; H04L 5/0001–26; H04W 8/22–245; H04W 24/02–10;
(Continued)

(56) References Cited

U.S. PATENT DOCUMENTS

| | | | |
|---|---|---|---|
| 7,872,986 | B2 | 1/2011 | Chun et al. |
| 8,693,381 | B2 | 4/2014 | Zhang et al. |

(Continued)

FOREIGN PATENT DOCUMENTS

| | | |
|---|---|---|
| CA | 3049700 A1 | 7/2018 |
| CN | 102655668 A | 9/2012 |

(Continued)

OTHER PUBLICATIONS

European Search Report for EP Patent Application No. 19847267.2, dated Mar. 18, 2022, 11 pages.

(Continued)

*Primary Examiner* — Timothy J Weidner
(74) *Attorney, Agent, or Firm* — Perkins Coie LLP

(57) ABSTRACT

Provided are a state determination method, a state indication method, a communication device, a communication system, and a storage medium. A base station sends state indication information to a terminal. After receiving the state indication information, the terminal can perform a state transition according to the state indication information.

16 Claims, 5 Drawing Sheets

(51) Int. Cl.
| | |
|---|---|
| *H04W 52/02* | (2009.01) |
| *H04W 52/38* | (2009.01) |
| *H04W 72/0446* | (2023.01) |
| *H04W 72/0453* | (2023.01) |
| *H04W 72/23* | (2023.01) |
| *H04W 72/563* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ... *H04W 52/0229* (2013.01); *H04W 52/0235* (2013.01); *H04W 52/386* (2013.01); *H04W 72/0446* (2013.01); *H04W 72/0453* (2013.01); *H04W 72/23* (2023.01); *H04W 72/563* (2023.01); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC ..... H04W 28/02–26; H04W 48/02–20; H04W 52/02–60; H04W 56/0005–0025; H04W 72/02–569; H04W 74/002–008; H04W 76/10–50; H04W 84/02–16; H04W 88/02–12; H04W 92/02–04; H04W 92/10; Y02D 30/70
See application file for complete search history.

(56) References Cited

U.S. PATENT DOCUMENTS

| | | | |
|---|---|---|---|
| 9,386,524 | B2 | 7/2016 | Feuersaenger et al. |
| 9,872,252 | B1 | 1/2018 | Ang et al. |
| 10,085,203 | B2 | 9/2018 | Xue et al. |
| 10,499,451 | B2 | 12/2019 | Tabet et al. |
| 10,602,442 | B2 | 3/2020 | Rune et al. |
| 2009/0213800 | A1 | 8/2009 | Lee et al. |
| 2015/0282208 | A1 | 10/2015 | Yi et al. |
| 2016/0269996 | A1 | 9/2016 | Wu et al. |
| 2017/0099635 | A1 | 4/2017 | Uchino et al. |
| 2017/0339641 | A1 | 11/2017 | Nigam et al. |
| 2018/0332655 | A1 | 11/2018 | Ang et al. |
| 2019/0313332 | A1* | 10/2019 | Wu .................. H04W 52/0229 |
| 2020/0015312 | A1 | 1/2020 | He et al. |
| 2020/0037396 | A1* | 1/2020 | Islam ............... H04W 52/0229 |
| 2020/0245244 | A1 | 7/2020 | Feng et al. |
| 2020/0413341 | A1 | 12/2020 | Xu et al. |
| 2021/0022075 | A1 | 1/2021 | Xu |

FOREIGN PATENT DOCUMENTS

| | | |
|---|---|---|
| CN | 102932884 A | 2/2013 |
| CN | 103582087 A | 2/2014 |
| CN | 103906123 A | 7/2014 |
| CN | 104205993 A | 12/2014 |
| CN | 104219740 A | 12/2014 |
| CN | 105009661 A | 10/2015 |
| CN | 106465451 A | 2/2017 |
| CN | 108235412 A | 6/2018 |
| CN | 108307406 A | 7/2018 |
| CN | 108307547 A | 7/2018 |
| JP | 2021521670 A | 8/2021 |
| KR | 1020090099511 A | 9/2009 |
| KR | 1020120076361 A | 7/2012 |
| RU | 2645757 C2 | 2/2018 |
| WO | 2012149319 A1 | 11/2012 |
| WO | 2016146147 A1 | 9/2016 |
| WO | 2016161708 A1 | 10/2016 |
| WO | WO-2018066923 A1 * | 4/2018 ........ H04W 52/0209 |
| WO | 2018136521 A1 | 7/2018 |
| WO | 2019196038 A1 | 10/2019 |

OTHER PUBLICATIONS

CN office action issued in corresponding CN Patent Application No. 201810911007.7, dated Dec. 22, 2022, 13 pages. English translation included.

KR office action issued in corresponding KR Patent Application No. 10-2021-7007069, dated Dec. 13, 2022, 7 pages. English translation included.

JP notice of allowance issued in corresponding JP Patent Application No. 2021-507511, dated Dec. 2, 2022, 3 pages.

KR notice of allowance issued in corresponding KR Patent Application No. 10-2021-7007069, dated Jun. 8, 2023, 8 pages. English translation included.

EP Communication under Rule 71(3) EPC issued in corresponding EP Patent Application No. 19847267.2, dated Jun. 1, 2023, 56 pages.

International Search Report Form PCT/ISA/210, and Written Opinion Form PCT/ISA/237, International Application No. PCT/CN2019/100148, pp. 1-5 International Filing Date Aug. 12, 2019 mailing date of search report Nov. 12, 2019.

CATT et al. "RP-180923: Study on UE Power Saving and Wakeup Mechanism" 3GPP TSG RAN Meetings #80, Jun. 14, 2018 (Jun. 14, 2018), the main body, section 4.1.

Intel Corporation, "Power Saving Signal for efeMTC," 3GPP TSG RAN WG1 Meeting #92bis, R1-1804694, Sanya, China, Apr. 16-20, 2018, 10 pages.

Office Action for KR Appl. No. 10-2021-7007328 dated Dec. 27, 2022 (with English translation, 10 pages).

Qualcomm Incorporated, "UE Power Saving during Active State," 3GPP TSG RAN WG2 NR #99, R2-1709117, Aug. 21-25, 2017, Berlin, Germany, 6 pages.

Extended European Search Report for EP Appl. No. 19846904.1, dated Mar. 11, 2022, 14 pages.

Qualcomm Incorporated, "Advanced Grant Indication for UE Power Saving," 3GPP TSG RAN WG1 #91, R1-1720709, Dec. 1, 2017, Reno, USA, 5 pages.

Qualcomm Incorporated, "Efficient monitoring of DL controls channels," 3GPP TSG RAN WG1 Meeting #91, R1-1720417, Dec. 1, 2017, Reno, USA, 11 pages.

Samsung, "DL power consumption reduction for eMTC," 3GPP TSG RAN WG1 Meeting #90, R1-1713542, Aug. 25, 2017, Prague, Czechia, 5 pages.

First Office Action for CN Appl. No. 201810912159.9, dated Oct. 25, 2021, with English translation, 18 pages.

Qualcomm Incorporated et al., "Wake-Up Signaling for C-DRX Mode," 3GPP TSG RAN WG2 NR #99, R2-1709652, Aug. 25, 2017, Berlin, Germany, 5 pages.

Qualcomm Incorporated, "UE Power Evaluation for DRX with Wake-Up Signaling," 3GPP TSG-RAN WG1 #87, R1-1612068, Nov. 18, 2016, Reno, USA, 7 pages.

International Search Report and Written Opinion for PCT Application No. PCT/CN2019/100183, filed on Aug. 12, 2019, mailed Oct. 23, 2019, 11 pages. English translation included.

Chinese Notification of Reexamination issued in CN Patent Application No. 201810911007.7, dated Jan. 3, 2024, 14 pages. English translation included.

European Search Report issued in EP Patent Application No. 23200830.0, dated Apr. 2, 2024, 14 pages.

3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15), 303 pages.

3GPP Ts 38.211 V15.2.0 (Jun. 2018), Technical Specification, 3rd Generation Partnership Project; Technical Specification Group Radio Access Network; NR; Physical channels and modulation (Release 15), 96 pages.

(56) References Cited

OTHER PUBLICATIONS

Interdigital Inc., "Alignment of Common Messages for Connection Control Procedures," 3GPP TSG-RAN WG2 Ad Hoc, R2-1706692, Qingdao, China, Jun. 27-29, 2017, 3 pages.

Interdigital Inc., "Harmonization of Connection Control Procedures and Messages," 3GPP TSG-RAN WG2 Meeting #99, R2-1708739, Berlin, Germany, Aug. 21-25, 2017, 4 pages.

Catt, "Summary of NR UE Power Consumption Email Discussion," 3GPP TSG-RAN #79, RP-180229, Chennai, India, Mar. 19-22, 2018, 4 pages.

3GPP Ts 36.300, V15.2.0, (2018-06), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, (Release 15), 357 pages.

* cited by examiner

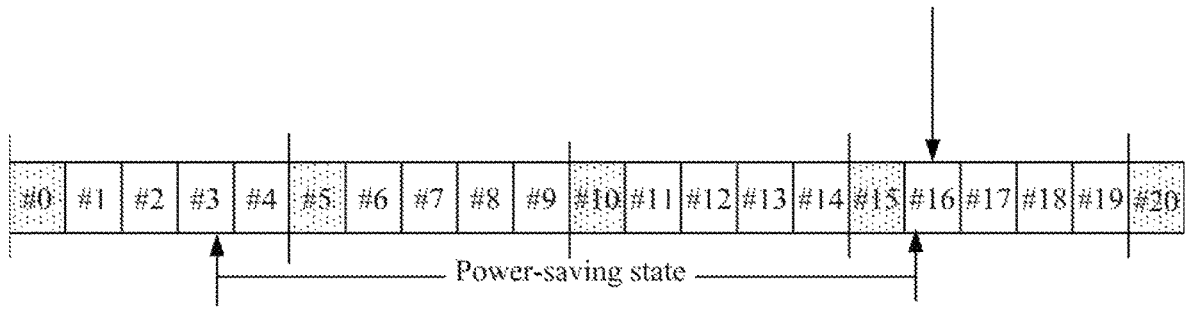
FIG. 4
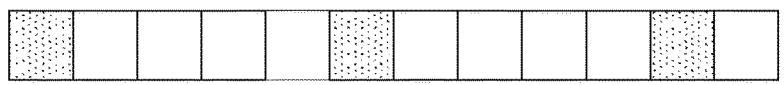
FIG. 5A
FIG. 5B
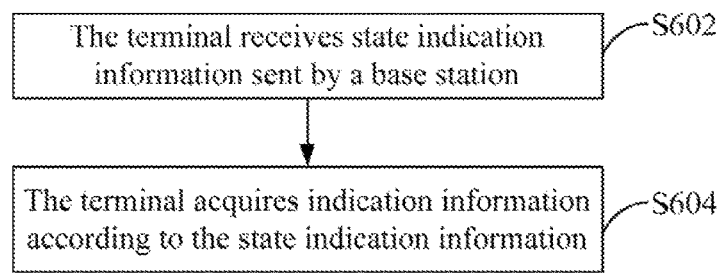
FIG. 6
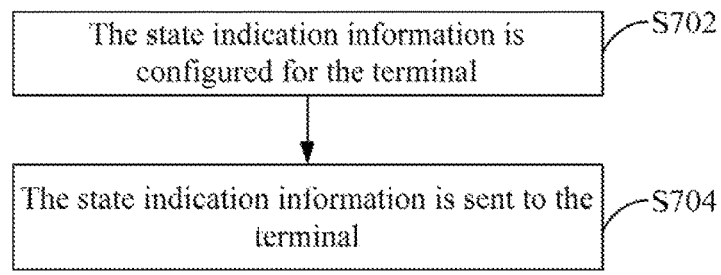
FIG. 7

STATE DETERMINING METHOD, STATE INDICATION METHOD, COMMUNICATION DEVICE, COMMUNICATION SYSTEM, AND STORAGE MEDIUM

CROSS-REFERENCE TO RELATED APPLICATIONS

This is a National Stage Application filed under 35 U.S.C. 371 based on International Patent Application No. PCT/CN2019/100148, filed on Aug. 12, 2019, which claims priority to Chinese Patent Application No. 201810911007.7 filed on Aug. 10, 2018, the disclosures of both of which are incorporated herein by reference in their entireties.

TECHNICAL FIELD

The present disclosure relates to the field of communications and, in particular, to a state determination method, a state indication method, a communication device, a communication system, and a storage medium.

BACKGROUND

At present, the 4th Generation (4G) mobile communication technology, Long-Term Evolution (LTE), Long-Term Evolution Advance (LTE-Advance) and the 5th Generation (5G) mobile communication technology are facing increasing requirements. For both the 4G system and the 5G system, how to support the features of enhanced mobile broadband, ultra-high reliability, ultra-low-latency transmission and massive connectivity is studied. To support the preceding features, the energy consumption of a terminal is increasing. To solve the energy consumption problem of a terminal, the energy-saving mechanism that has been proposed in the current 5G system includes the discontinuous reception (DRX) mechanism. However, the current DRX mechanism is not flexible enough to satisfy the requirement for dynamic resource configuration in 5G currently.

SUMMARY

Embodiments of the present disclosure provide a state determination method, a state indication method, a communication device, a communication system, and a storage medium.

An embodiment of the present disclosure provides a state determination method. The state determination method includes the following step: state indication information sent by a base station is received. The state indication information is used for indicating a state transition of a terminal.

An embodiment of the present disclosure further provides a state indication method. The state indication method includes the following step: state indication information is sent to a terminal. The state indication information is used for indicating a state transition of the terminal.

An embodiment of the present disclosure further provides a communication device. The communication device includes a processor and a memory. The processor is coupled to the memory. The processor is configured to execute a state determination program stored in the memory to perform the steps of the preceding state determination method.

An embodiment of the present disclosure further provides a communication device. The communication device includes a processor and a memory. The processor is coupled to the memory. The processor is configured to execute a state indication program stored in the memory to perform the steps of the preceding state indication method.

An embodiment of the present disclosure further provides a communication system. The communication system includes a terminal and a base station. The terminal is the preceding communication device in which the processor is configured to execute the state determination program stored in the memory to perform the steps of the state determination method. The base station is the preceding communication device in which the processor is configured to execute the state indication program stored in the memory to perform the steps of the state indication method.

An embodiment of the present disclosure further provides a storage medium storing at least one of a state determination program or a state indication program. The state determination program is executable by one or more processors so that the steps of the preceding state determination method are performed. The state indication program is executable by one or more processors so that the steps of the preceding state indication method are performed.

According to the state determination method, the state indication method, the communication device, the communication system, and the storage medium provided in the embodiments of the present disclosure, the base station sends the state indication information to the terminal, and after the terminal receives the state indication information, the terminal can perform the state transition according to the state indication information. Compared with the manner of semi-static configuration by the base station, this manner is more flexible so that the base station can control the state that the terminal is in according to the transmission requirements of the terminal. When the terminal has fewer transmission requirements or has no transmission requirement, the terminal can be controlled to be in a relatively energy-saving state, thereby reducing the power consumption of the terminal. When the terminal has more transmission requirements, the terminal can be controlled to be in an awake state. This manner is different from the related art in which information can be transmitted only after the time preconfigured for the terminal to be in the awake state. Compared with related schemes, according to the schemes provided in the embodiments of the present disclosure, the state indication is more flexible. The energy consumption of the terminal can be reduced to a great extent, the power of the terminal can be saved, and the life of the terminal can be prolonged. Moreover, it can be ensured that when there is a transmission requirement for the terminal, a transmission opportunity can be obtained quickly to implement information transmission. Thus, the communication efficiency can be improved, resource configuration can be optimized and user experience of the terminal side can be improved.

BRIEF DESCRIPTION OF DRAWINGS

FIG. 4 is a schematic diagram illustrating a structure of a combination according to embodiment three of the present disclosure.

FIG. 5A is a schematic diagram illustrating a state of a terminal on each slot according to embodiment three of the present disclosure.

FIG. 5B is a schematic diagram illustrating a structure of a combination corresponding to DCI format 2_0 according to embodiment three of the present disclosure.

FIG. 6 is a flowchart of a state determination method according to embodiment four of the present disclosure.

FIG. 7 is a flowchart of a state indication method according to embodiment five of the present disclosure.

DETAILED DESCRIPTION

In order for the object, schemes and advantages of the present disclosure to be more apparent, embodiments of the present disclosure are further described below in detail in conjunction with implementations and drawings. It is to be understood that the embodiments described herein are intended to explain the present disclosure and not to limit the present disclosure. If not in collision, the embodiments below and the features thereof may be combined with each other.

Embodiment One

To solve the problem of poor flexibility in controlling the state of a terminal through the DRX mechanism in the related art, this embodiment provides a state indication scheme. The state indication scheme is implemented in a manner in which a base station side performs a state indication method and a terminal side performs a state determination method.

In this embodiment, the terminal may be in at least two states, namely a first state and a second state. Here, it is assumed that in the first state, the energy consumption of the terminal caused by communications is lower. It is to be understood that the reason why the power consumption of the terminal in the first state brought by communications is relatively low may be that the terminal in the first state activate fewer frequency-domain resources, or may be that the terminal in the first state detect and receive less downlink information, or may be that the terminal has lower power for performing uplink transmission, or even may be a combination of these reasons.

In some examples, the first state may be referred to as an "energy-saving state", and correspondingly, the second state may be referred to as an "awake state". However, it is to be understood that the "energy-saving state" is a specific name of the first state in only some situations and the "awake state" is a specific name of the second state in only some situations. In other cases, the first state may be referred to as a "power-saving state", a "low power-consumption state", a "semi-sleep state" or the like. Similarly, in other situations, the second state may be referred to as an "operation state", a "high-performance state" or the like. It can be seen that the specific names of the first state and the second state in examples should not limit this embodiment.

It is to be understood that in the first state or the second state, there may be multiple sub-states, or there may be multiple different levels for the first state or the second state, and at different levels, the terminal may have different behaviors. For example, the energy-saving state may include a first-level energy-saving state, a second-level energy-saving state and the like. At different energy-saving levels, the energy consumption of the terminal caused by communications is also different. Therefore, the so-called first state and the so-called second state in this embodiment do not refer to merely two fixed states.

Figure 1:
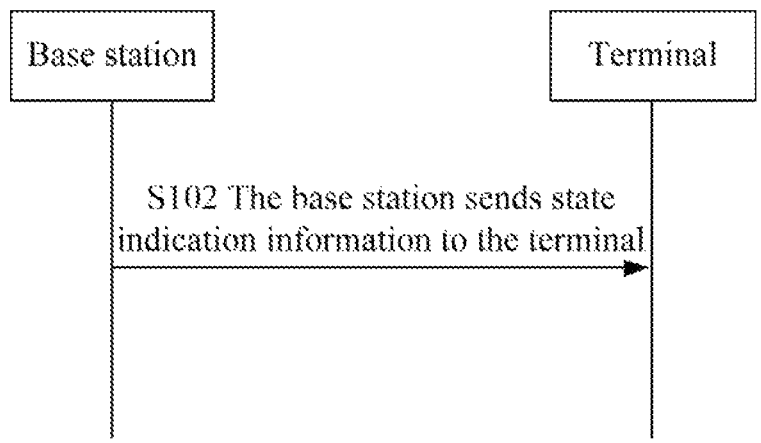
FIG. 1 is a flowchart of a state indication method according to embodiment one of the present disclosure.

As shown in FIG. 1, the state indication method includes the steps below.

In S102, the base station sends state indication information to the terminal.

When the state indication information needs to be sent to the terminal, the base station may configure the state indication information and then send the state indication information to the terminal so that the terminal may perform a state transition after receiving the state indication.

The base station may carry the state indication information through a state transition signal, that is, send the terminal the state indication information in the form of the state transition signal. In some examples of this embodiment, the state indication information may also be carried to the terminal through a state transition channel. It is to be understood that compared with the state transition signal, the state transition channel can contain more fields, can carry more information to the terminal, but occupies more resources. In addition, in some examples of this embodiment, the state indication information may be sent to the terminal through both a state transition signal and a state transition channel. The terminal may need to detect both the state transition signal and the state transition channel. Only after the state transition channel and the state transition signal are obtained, can the terminal acquire the complete indication from the base station.

It is to be understood that the state indication information sent by the base station to the terminal is usually used for instructing the terminal to switch from the current state to another state, but in some situations, the state indicated by the state indication information sent by the base station to the terminal is the same as the current state of the terminal, and then the terminal may remain in the current state and not perform state switching.

In an example of this embodiment, the state indication information sent by the base station to the terminal may enable the terminal to switch from the current state to another different state directly after receiving the state indication information. That is, such state indication information does not need to indicate to the terminal a target state the terminal is to switch to, and the function of such state indication information is mainly to trigger the terminal to perform the state switching. Therefore, in this case, the terminal can switch from the current state to another state directly after detecting and receiving the state indication information from the base station. Of course, this scheme is more applicable to a scenario where the terminal has only two states or is more applicable to a scenario where the terminal has multiple states, but the sequence of switching between the states is predetermined.

Figure 2:
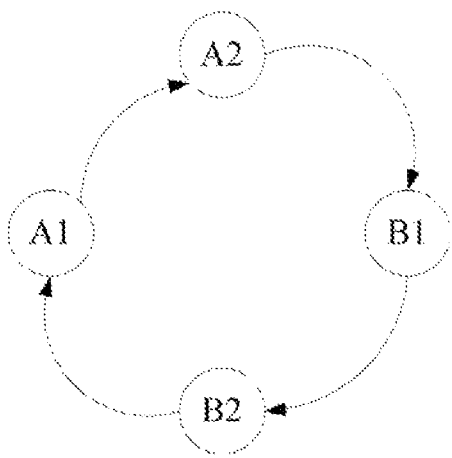
FIG. 2 is a schematic diagram illustrating a sequence of state switching of a terminal side according to embodiment one of the present disclosure.

For the first scenario, assuming that the terminal has state A and state B, then when the terminal in state A receives the state indication information, the terminal may switch to state B directly; conversely, when the terminal in state B receives the state indication information for triggering the terminal to perform the state switching, the terminal may switch to state A directly. For the second scenario, assuming that the terminal can be in four states: A1, A2, B1 and B2, where the sequence of switching between the four states is shown in FIG. 2, i.e. A1→A2→B1→B2→A1, then after the terminal receives the state indication information from the base station, the terminal may jump to the next state according to the current state of the terminal. It is to be understood that the sequence of switching between the states of the terminal side may be predefined by a system or may be semi-statically configured for the terminal by the base station through high-layer signaling.

This embodiment provides a state transition scheme in which the base station sends the state indication information to terminal to enable the terminal to enter the corresponding state according to the received state indication information, thereby enhancing the flexibility of the state control of the terminal.

Embodiment Two

In some other examples of this embodiment, state indication information sent by a base station to a terminal includes at least one of the following indication information: (1) a state identifier; (2) a frequency-domain resource index; (3) a behavior level indication; (4) an indication about whether first indication information is required to be received; (5) a receiving indication related to the first indication information; (6) a timer; (7) a counter; (8) a frame structure; or (9) requiring receiving at least one of an association signal or an association channel.

The following further describes the preceding several types of information separately.

"State Identifier"

The State Identifier is Used for Indicating Whether the Base Station Instructs the terminal to enter a first state or the base station instructs the terminal to enter a second state, that is, whether a target state is the first state or a target state is the second state.

"Frequency-Domain Resource Index"

The frequency-domain resource index is used for indicating which frequency-domain resources are required for the terminal to enter the target state. In this embodiment, the frequency-domain resource index includes at least one of a bandwidth part (BWP) index or a carrier index. It is to be understood that in addition to BWPs and carriers, frequency-domain resources can also be divided into many other types such as subcarriers, minimum system bandwidths, resource block groups (RBGs) and resource blocks (RBs). Therefore, in some other examples of this embodiment, the frequency-domain resource index may be an index of another frequency-domain resource type.

"Behavior Level Indication"

The behavior level indication is used for indicating to the terminal the behavior of the terminal after the terminal enters the corresponding target state or used for indicating which level of target state the terminal enters. In an example in which the target state is an energy-saving state, the behavior level is an energy-saving level of the energy-saving state the terminal enters. The behavior level indication indicated by the state indication information to the terminal may specify one of multiple behavior levels from the multiple behavior levels. One behavior level may include at least one of the following: (1) a time-domain range in the target state (the first state or the second state); (2) a frequency-domain range in the target state (the first state or the second state); (3) determining whether at least one of a first downlink channel or a first downlink signal is required to be received; (4) determining whether at least one of a first uplink channel or a first uplink signal is required to be sent; or (5) a transmit power level supported in the target state (the first state or the second state).

That is, at different behavior levels, the terminal has one or more differences in the preceding five aspects. In an example of a first energy-saving level and a second energy-saving level, assuming that the energy-saving effect of the first energy-saving level is better than that of the second energy-saving level, then at the first energy-saving level, the terminal has a larger time-domain range when in the first state or has a larger frequency-domain range when in the first state. It is also possible that the time-domain range and the frequency-domain range corresponding to the first energy-saving level are larger than the time-domain range and the frequency-domain range corresponding to the second energy-saving level respectively. Additionally, at the first energy-saving level, the terminal may need to perform fewer transmission actions. For example, the terminal receives only at least one of the first downlink channel or the first downlink signal, or sends only at least one of the first uplink channel or the first uplink signal. Alternatively, the terminal even neither sends the first uplink channel or the first uplink signal nor receives at least one of the first downlink channel or the first downlink signal. However, at the second energy-saving level, the terminal may not only need to receive at least one of the first downlink channel or the first downlink signal, but also need to send at least one of the first uplink channel or the first uplink signal. Additionally, the terminal may have different transmit power when at different energy-saving levels. For example, the transmit power of the terminal at the first energy-saving level is less than the transmit power of the terminal at the second energy-saving level.

In an example of this embodiment, at least one of the first downlink channel or the first downlink signal includes at least one of a synchronization signal (SS), a physical broadcast channel (PBCH), a channel state information reference signal (CSI-RS), a physical downlink control channel (PDCCH), a system information block 1 (SIB1), other SIBs, or paging information.

At least one of the first uplink channel or the first uplink signal includes at least one of a sounding reference signal (SRS), a grant-free physical uplink shared channel (PUSCH) or a demodulation reference signal (DMRS).

Therefore, in an example of this embodiment, when the terminal at the first energy-saving level and the terminal at the second energy-saving level respectively, the number of at least one of the first downlink channel or the first downlink signal that the terminal needs to receive is different. For example, the terminal at the first energy-saving level needs to receive the SS and the PBCH while the terminal at the second energy-saving level needs to receive the SS, the PBCH and the CSI-RS.

"Indication about Whether First Indication Information is Required to be Received"

The "indication about whether first indication information is required to be received" mainly indicates whether the terminal needs to receive the first indication information after receiving the state indication information.

"Receiving Indication Related to the First Indication Information".

The "receiving indication related to the first indication information" is a description of receiving of the first indication information when the "indication about whether first indication information is required to be received" in the state indication information indicates that the terminal needs to further receive the first indication information. In an example of this embodiment, the receiving indication related to the first indication information includes at least one of the following: (1) a time-domain resource for receiving the first indication information; (2) a frequency-domain resource for receiving the first indication information; (3) receiving a modulation and coding scheme (MCS) of the first indication information; or (4) information related to blind detecting the first indication information.

The (4) "information related to the blind detecting the first indication information" may include at least one of the following or a combination thereof: the number of candidates corresponding to the first indication information; an aggregation level corresponding to the first indication information; a radio network temporary identifier (RNTI) used in the blind detecting the first indication information; a load length of the first indication information; or a downlink control information (DCI) format type for the first indication information.

"Timer" and "Counter"

The timer and the counter are both mainly used for the terminal to determine the duration for which the terminal is in the corresponding target state, that is, to determine when the target state ends.

"Frame Structure"

The frame structure may be used for indicating to the terminal at least one of two types of the information below.

The first type of information: In terms of the time domain, the frame structure may indicate transmission directions on N time units to the terminal. N is a positive integer. In this embodiment, one time unit is, but not limited to, any one of a radio frame, a half frame, a subframe, a slot, a mini-slot or an orthogonal frequency division multiplexing (OFDM) symbol. The transmission directions include downlink transmission, uplink transmission, flexible transmission and the like.

The second type of information: In terms of the frequency domain, the frame structure may indicate transmission directions on M frequency units to the terminal. M is a positive integer. It can be understood that the type of the so-called frequency unit may be any one of a carrier, a BWP, an RBG or an RB.

In some examples of this embodiment, one frequency unit indicated by the frame structure may be at least one of the following: (1) a frequency-domain resource for receiving the state indication information; (2) a frequency-domain resource indicated in the state indication information; (3) a primary carrier; (4) an activated primary carrier and an activated secondary carrier; (5) an activated BWP; (6) a default BWP; or (7) a predefined frequency-domain resource or a frequency-domain resource semi-statically configured by the base station.

In this embodiment, the primary carrier may be divided into a primary cell (Pcell) in a master cell group and a primary secondary cell (Pscell) in a secondary cell group.

Here is a brief description of how to determine the value of N: N may be predefined by a system or semi-statically configured by the base station or may, of course, be dynamically determined by the base station according to a time-domain position for sending the state indication information.

For example, in an example of this embodiment, the value of N is K times a first length, where K is a positive integer. The first length is semi-statically configured by the base station. For example, the first length may be a period of blind detection of DCI format 2_0 or a search space supporting DCI format 2_0, where the blind detection is performed by the terminal, and the period of the blind detection is configured by the base station.

In some other cases, the value of N may be related to at least one of the following factors: a time unit index for receiving the state indication information; the size of the first length semi-statically configured by the base station; or the position of a time unit for receiving the state indication information, where the time unit is in one first length.

For the case where the value of N is predefined by the system or semi-statically configured by the base station, for example, the value of N may be equal to the period of detection of particular indication information or search space, where the detection is performed by the terminal, and the period of the detection is configured by the base station. In an example, the value of N is equal to the period of blind detection of DCI format 2_0 or a search space supporting DCI format 2_0, where the blind detection is performed by the terminal, and the period of the blind detection is configured by the base station.

For the case where the value of N is dynamically determined by the base station according to the time-domain position for sending the state indication information, for example, assuming that the time unit in which the base station sends the state indication information is Q, the time unit in which the terminal performs the latest blind detection of particular indication information or search space opportunity is P, and the interval between P and Q is n time units, then the "frame structure" indicated by the state indication information may indicate to the terminal transmission direction information of n+1 time units, or the "frame structure" indicated by the state indication information may indicate to the terminal transmission direction information of more than n+1 time units.

Figure 3:
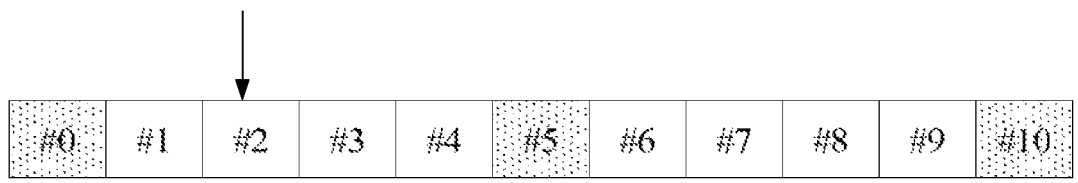
FIG. 3 is a schematic diagram illustrating distribution of DCI format 2_0 detection opportunities of a terminal according to embodiment two of the present disclosure.

As shown in FIG. 3, DCI format 2_0 detection opportunities of the terminal are distributed in slots with serial numbers of "#0", "#5" and "#10" respectively, and the base station sends the state indication information to the terminal on a slot with a serial number of "#2". It can be seen that after the terminal receives the state indication information, the terminal may detect DCI format 2_0 sent by the base station on only a slot with a serial number of "#5", and obtain transmission direction indications of the slot with the serial number of "#5" and subsequent slots according to DCI format 2_0. Thus, in order for the terminal to know the transmission directions on slots "#2", "#3" and "#4" after receiving the state indication information, the base station needs to use the state indication information to indicate to the terminal the transmission directions on the three slots. In this case, the value of N is related to the time-domain position in which the base station sends the state indication information to the terminal and the time-domain position where the latest DCI format 2_0 detection opportunity of the terminal is located.

In another case, if the system predefines or the base station semi-statically configures that the terminal receives the state indication information on only the time unit for detecting DCI format 2_0 or the time unit of the search space containing DCI format 2_0, then the "frame structure" indicated by the state indication information may indicate transmission direction information of at least A time units. A denotes the period of detecting DCI format 2_0 by the terminal or the period of the search space containing DCI format 2_0.

"Requiring Receiving at Least One of an Association Signal or an Association Channel".

The state indication information for indicating "requiring receiving at least one of an association signal or an association channel" refers to that the state indication information is mainly used for indicating that after the terminal receives the state indication information in a certain time-domain position, the terminal needs to receive at least one of the association signal or the association channel in a position associated with this time-domain position.

In an example of this embodiment, if the terminal receives the state indication information, the terminal detects at least one of the association signal or the association channel in a target second time resource of a target first time resource. Assuming that the time-domain resource position in which the base station sends at least one of the association signal or the association channel is T1, and the time-domain resource position in which the base station sends the state indication information is T2, then the system may predefine that T2 and T1 are in the same first time resource, while T1 is on the q-th second time resource after T2, and q may be a non-negative integer. Here the first time resource and the second time resource refer to two types of time resources having different granularities. For example, the first time resource may be a radio frame, a half frame, a subframe, a slot or a mini slot, and the second time resource may be a subframe, a slot, a mini slot or an OFDM symbol. Of course, the granularity of the first time resource is usually greater than the granularity of the second time resource. Therefore, when the first time resource is the radio frame, the second time resource may be the subframe, the slot, the mini slot or even the OFDM symbol; when the first time resource is the slot, the second slot may be the mini slot or the OFDM symbol. According to a sending time-domain resource configuration T2 of the state indication information, the terminal can determine a sending time-domain resource configuration T1 of at least one of an association signal or an association channel and then detect and receive at least one of the association signal or the association channel on T1.

Therefore, after the terminal detects the state indication information on T1, the terminal may detect at least one of the association signal or the association channel on the same first time resource as T1. Even, because q may be a non-negative integer, T1 and T2 may be completely the same, and the terminal may detect at least one of the association signal or the association channel on T1 simultaneously. Of course, the association relationship between the sending time-domain resource configuration T1 of at least one of the association signal or the association channel and the sending time-domain resource configuration T2 of the state indication information may include at least one of the types of association relationships below in addition to the preceding type of association relationship.

The first type of association relationship is that T1 is in the i-th first time resource after T2, where i is a non-negative integer.

The second type of association relationship is that T1 is in the k-th second time resource on the i-th first time resource after T2, where k and i are both non-negative integers.

The target first time resource may be a first time resource on which the state indication information is received; or the target first time resource is the n-th first time resource after the first time resource on which the state indication information is received, where n is a positive integer.

The target second time resource may be a second time resource on which the state indication information is received; or the target second time resource may be the m-th second time resource after the second time resource on which the state indication information is received, where m is a positive integer. The second time resource is any one of a subframe, a slot, a mini slot or an OFDM symbol.

It is to be understood that the association relationship between T1 and T2 may be predefined by the system or semi-statically configured for the terminal by the base station. Additionally, in the preceding example, the terminal determines the time-domain resource configuration T1 for receiving at least one of the association signal or the association channel according to the time-domain resource configuration T2 for receiving the state indication information so that reception of at least one of the association signal or the association channel by the terminal can be indicated by reception of the state indication information by the terminal. However, in other examples of this embodiment, the system may enable, through predefinition by the system or semi-static configuration by the base station, the terminal to determine the time-domain resource configuration T2 for receiving the state indication information according to the time-domain resource configuration T1 for receiving at least one of the association signal or the association channel so that the terminal may detect and receive the state indication information according to detection and receiving of at least one of the association signal or the association channel. This scheme is described in subsequent embodiments and is not repeated here.

Generally, in this embodiment, the association relationship between T1 and T2 may be at least one of the following: (1) T1 is on the i-th first time resource after T2, where i is a non-negative integer; (2) T2 is on the j-th first time resource after T1, where j is a non-negative integer; (3) T1 and T2 are on the same first time resource, and T1 is on the p-th second time resource after T2, where p is a non-negative integer; or (4) T1 and T2 are on the same first time resource, and T2 is on the q-th second time resource after T1, where q is a non-negative integer.

In an example of this embodiment, if the terminal does not receive the state indication information on a time-domain resource predefined by the system or configured by the base station, the latest detection of at least one of an association signal or an association channel may be cancelled.

In this embodiment, at least one of the association signal or the association channel may be at least one of a PDCCH, a CSI-RS, an SS, a PBCH, paging, an SIB1, or other SIBs. In an example, if at least one of the association signal or the association channel refers to the PDCCH, the PDCCH may be a PDCCH carrying a particular DCI format or a PDCCH whose cyclic redundancy check (CRC) bit is scrambled by a particular RNTI.

The state indication information provided in this embodiment can indicate one or more types of the preceding various indication information to the terminal so that the terminal can enter a corresponding state according to the received state indication information. On the basis of the scheme in the related art, the state of the terminal is controlled more flexibly, facilitating the balance between the energy consumption and communication efficiency of the terminal.

Embodiment Three

In this embodiment, the scheme in which the state indication information indicates the frame structure to the terminal is further described on the basis of embodiment two.

In this embodiment, two schemes in which the base station indicates the frame structure to the terminal are provided.

Scheme one: The base station may configure a dedicated slot format indication for the terminal. In this case, the frame structure corresponding to the state indication information indicates transmission directions on N time units starting from the time when the terminal receives the state indication information. Here the magnitude of N is equal to the number of time units contained in a combination indicated by a combination index from a combination set. It is to be understood that in this case, the first time unit of the combination, that is, the starting time unit, is the time unit in which the terminal receives the state indication information.

Referring to FIG. 4, FIG. 4 is a schematic diagram of a combination corresponding to a certain combination index. The combination includes 7 time units. If the base station indicates the frame structure to the terminal through the preceding scheme one, the time unit in which the terminal receives the state indication information is the first time unit in the combination. Therefore, after the terminal determines the corresponding combination according to the state indication information, the terminal may determine, according to a transmission direction on each time unit in the combination, transmission directions on the 7 time units including the time unit in which the state indication information is received.

Scheme two: The base station indicates to the terminal, in conjunction with the previously sent DCI format 2_0, transmission directions on N time units starting from the time when the terminal receives the state indication information.

The terminal may not receive the DCI format 2_0 previously sent by the base station since the terminal may be in the energy-saving state previously. Therefore, the base station may retransmit the DCI format 2_0 missed by the terminal. The DCI format 2_0 retransmitted by the base station is usually the latest DCI format 2_0 missed by the terminal. However, in this case, the starting time unit of the frame structure indicated by this DCI format 2_0 may have passed. That is, the first time unit indicated by the frame structure is before the time when the terminal receives the state indication information. Therefore, after the terminal determines the corresponding combination according to this DCI format 2_0, the terminal cannot directly use the transmission direction of the first time unit in the combination as the transmission direction of the time unit for receiving the state indication information.

In order for the terminal to determine which time unit in the corresponding combination is the time unit in which the state indication information is received, the base station also needs to indicate a time-domain position identifier to the terminal when sending the state indication information. The time-domain position identifier is used for indicating to the terminal the position of the target time unit in all time units in the corresponding combination.

Here a description is given using an example in which the time unit is a slot. Referring to FIGS. 5A and 5B, FIG. 5A shows the state of the terminal on each of slots with serial numbers of "#0" to "#20". The terminal enters the energy-saving state from a slot with a serial number of "#3" until a slot with a serial number of "#16" in which the terminal receives the state indication information sent by the base station and is thus awakened. At the time when the base station causes, through the state indication information, the terminal to enter the awake state from the energy-saving state, the base station carries the latest DCI format 2_0 missed by the terminal to the terminal. It is assumed that the structure of the combination corresponding to this DCI format 2_0 is as shown in FIG. 5B. The terminal can know that the terminal is awakened on slot "#16" but cannot directly determine which position of slot "#16" in the combination of FIG. 5B. Therefore, when the base station indicates the frame structure to the terminal, the base station also specify, through the time-domain position identifier, the position of a certain particular slot (that is, the target slot) in the combination of FIG. 5B so that the terminal may determine the position of slot "#16" in the combination according to the position of the target slot in the combination.

It is to be understood that the target time unit above may refer to the time unit on which the terminal receives the frame structure indication (that is, the time unit on which the terminal receives the state indication information sent by the base station). For example, the target slot in the preceding example may be slot "#16". In addition to this, the target time unit may also be other time units, for example, the time unit where the latest detection opportunity of at least one of a target signal or a target channel is located before the time unit on which the terminal receives the frame structure indication. In an example in which at least one of the target signal or the target channel is DCI format 2_0, the target time unit may be the time unit where the previous DCI format 2_0 detection opportunity is located. Of course, in addition to the time unit where the latest DCI format 2_0 detection opportunity is located before the time unit on which the terminal receives the frame structure indication, the target time unit may also be other ordinary time units. For example, in the preceding example, the target slot may be a certain slot before slot "#16" or a certain slot after slot "#16". For example, if the time-domain position identifier indicates the position of slot "#17" in the combination, then the terminal may determine the position of slot "#16" in the combination after determining the position of slot "#17" in the combination according to the time-domain position identifier. Undoubtedly, in order to reduce the operations of the terminal in determining the position of the slot in which the terminal receives the state indication information in the combination, the base station may use the time-domain position identifier to directly indicate the position of the slot in which the terminal receives the state indication information in the combination.

The combination set is mentioned above, and the combination set may be predefined by the system or semi-statically configured by the base station. In some examples of this embodiment, the terminal may also apply a particular rule according to a combination set configured for DCI format 2_0 by the base station to derive the first information. For ease of description, the combination set configured for DCI format 2_0 by the base station may be referred to as "combination set 1", and the derived combination set may be referred to as "combination set 2". In some examples of this embodiment, the rule used by the terminal for obtaining combination set 2 includes at least one of the two rules below.

(1) Combinations each containing a number (equal to a preset length) of slots are selected from combination set 1 to constitute combination set 2. Of course, in some cases, combinations each containing a number (not greater than the preset length) of slots may be selected from combination set 1 to constitute combination set 2. The preset length here may be a semi-statically configured value.

(2) The first m combinations in combination set 1 are selected in ascending order of index numbers to obtain combination set 2. Here m is a positive integer predefined by the system or semi-statically configured by the base station.

In some examples of this embodiment, the starting time unit indicated by the frame structure indicated by the state indication information may be the time unit where the latest detection opportunity of at least one of the target signal or the target channel is located. For example, in some examples, at least one of the target signal or the target channel is DCI format 2_0; therefore, the frame structure corresponding to the state indication information may be the time unit where the previous DCI format 2_0 detection opportunity is located. It is to be understood that, in some other examples of this embodiment, at least one of the target signal or the target channel may be other signals or channels other than DCI format 2_0.

This embodiment provides two schemes for the base station to indicate to the terminal the transmission directions of a certain number of time units after the terminal enters the target state so that the base station can indicate the frame structure to the terminal no matter the terminal is awakened at any time domain position, thereby avoiding the case where the base station can awaken the terminal in only a fixed time-domain position due to inflexible indication of the frame structure and improving the flexibility of the base station to indicate the state of the terminal.

Embodiment Four

Embodiment two describes various types of indication information that can be indicated by state indication information sent by a base station to a terminal. Embodiment three further describes how state indication information indicates a frame structure. This embodiment describes how state indication information indicates indication information other than the frame structure.

Referring to FIG. 6, FIG. 6 shows a flowchart of a state determination method performed by a terminal side in a state indication scheme.

In S602, a terminal receives state indication information sent by a base station.

The terminal may detect state information on time-domain resources predetermined by a system. If the base station needs to instruct the terminal to perform a state transition, the base station sends the state indication information on one or more of these time-domain resources. For example, the terminal may need to detect at least one of a certain particular signal or a certain particular channel, and detection opportunities of at least one of the particular signal or the particular channel may be predefined by the system or semi-statically configured by the base station. In this case, these detection opportunities may be configured for the state indication information at the same time in the manner of predefinition by the system or semi-static configuration by the base station, so that the terminal may detect not only at least one of the particular signal or the particular channel but also the state indication information on these detection opportunities. In an example of this embodiment, at least one of the particular signal or the particular channel may be DCI format 2_0. Therefore, the terminal may detect the state indication information on the detection opportunity corresponding to DCI format 2_0.

In another example of this embodiment, the system may configure, in a predefinition manner, an association relationship between a sending time-domain resource of the state indication information and a sending time-domain resource of at least one of an association signal or an association channel. In this manner, the terminal may determine when to receive the state indication information according to a time-domain resource on which at least one of the association signal or the association channel is received. For example, assuming that a sending time-domain resource configuration of at least one of the association signal or the association channel is T1, and a sending time-domain resource configuration of the state indication information is T2, then the system predefines that T2 and T1 are on the same first time resource, while T2 is in the p-th second time resource after T1. Here the first time resource and the second time resource refer to two types of time resources having different granularities. For example, the first time resource may be a radio frame, a half frame, a subframe, a slot or a mini slot, and the second time resource may be a subframe, a slot, a mini slot or an OFDM symbol. Of course, the granularity of the first time resource is usually greater than the granularity of the second time resource. Therefore, when the first time resource is the radio frame, the second time resource may be the subframe, the slot, the mini slot or even the OFDM symbol; when the first time resource is the slot, the second slot may be the mini slot or the OFDM symbol. According to the sending time-domain resource configuration T1 of at least one of the association signal or the association channel, the terminal can determine the sending time-domain resource configuration T2 of the state indication information and then detect and receive the state indication information on T1.

Of course, the association relationship between the sending time-domain resource configuration T1 of at least one of the association signal or the association channel and the sending time-domain resource configuration T2 of the state indication information may include at least one of the types of association relationships below in addition to the preceding type of association relationship.

The first type of association relationship is that T2 is in the j-th first time resource after T2, where j is a non-negative integer.

The second type of association relationship is that T2 is in the k-th second time resource on the j-th first time resource after T2, where k and j are both non-negative integers.

It is to be understood that the association relationship between T1 and T2 may be illustrated using other examples. The details are described in embodiment two and are not repeated here.

In S604, the terminal acquires indication information according to the state indication information.

No matter how the terminal determines the sending time-domain resource of the state indication information, the terminal may acquire the indication information indicated by the state indication information according to the state indication information after receiving the state indication information from the base station.

In some examples of this embodiment, the state indication information may indicate the corresponding indication information to the terminal through information content carried in the state indication information. In some other examples of this embodiment, the state indication information may indicate the corresponding indication information to the terminal through the sending situation of the state indication information. The process of acquiring indication information by the terminal in the preceding two situations is described below.

Manner one: The terminal acquires indication information according to the content of the state indication information. Optionally, the terminal may determine the indication information in any one of the manners below.

(1) The terminal acquires the indication information according to a sequence carried in the state indication information.

(2) The terminal acquires the indication information according to a generation parameter of the sequence in the state indication information.

(3) The terminal acquires the indication information according to an orthogonal cover code of the state indication information.

(4) The terminal acquires the indication information according to whether a target information indication field exists in the state indication information.

(5) The terminal acquires the indication information according to information carried in the target information indication field of the state indication information.

A description is given below using an example in which the terminal acquires a state identifier according to the state indication information.

According to the preceding scheme (1), the terminal and the base station may divide available sequences into multiple groups in advance, where different groups correspond to different state identifiers. For example, group A corresponds to a first state indicator (indicating entering a first state), and group B corresponds to a second state indicator (indicating entering a second state). The terminal determines whether the state identifier corresponding to the received state indication information is the state identifier of the first state or the state identifier of the second state according to a correspondence between different sequences and different state identifiers. That is, the terminal determines, according to a sequence carried in the received state indication information, whether the base station instructs the terminal to enter the first state or instructs the terminal to enter the second state. If the terminal detects that the sequence of the state indication information belongs to group A, the terminal knows that the state indication information is used for instructing the terminal to enter the first state. If the terminal detects that the sequence carried in the state indication information belongs to group B, the terminal knows that the state indication information is used for instructing the terminal to enter the second state.

According to the preceding scheme (2), the terminal and the base station may divide the sequence generation parameter values of the state indication information into multiple groups in advance, where different groups correspond to different state identifiers. For example, group A corresponds to a first state identifier, and group B corresponds to a second state identifier. The terminal determines, according to a correspondence between different sequence generation parameter values and different states, whether the received state indication information is used for instructing the terminal needing to enter the first state or instructs the terminal needing to enter the second state. If the terminal detects that a sequence generation parameter value of a state transition signal belongs to group A, the terminal knows that the state transition signal instructs the terminal to enter the first state. If the terminal detects that a sequence generation parameter value of a state transition signal belongs to group B, the terminal knows that the state transition signal instructs the terminal to enter the second state.

In scheme (3), the terminal and the base station divide the orthogonal cover codes of the state indication information into multiple groups, where different groups correspond to different states. For example, group A corresponds to a first state, and group B corresponds to a second state. The terminal determines, according to a correspondence between different orthogonal cover codes and different states, whether the received state indication information is used for instructing the terminal to enter the first state or used for instructing the terminal to enter the second state. If the terminal detects that the orthogonal cover code of the state indication information belongs to group A, the terminal knows that the state indication information is used for instructing the terminal to enter the first state. In this case, the orthogonal cover code of the state indication information is equivalent to the state identifier of the first state. If the terminal detects that the orthogonal cover code of the state indication information belongs to group B, the terminal knows that the state indication information is used for instructing the terminal to enter the second state. In this case, the orthogonal cover code carried in the state indication information is equivalent to the state identifier of the second state.

In scheme (4), when the base station configures the state indication information, the base station may determine whether to carry the target information indication field in the state indication information according to the target state that the terminal is instructed to enter. For example, the base station and the terminal agree in advance that if the target information indication field is carried, then it is indicated that the base station instructs the terminal to enter the first state; otherwise, it is indicated that the base station instructs the terminal to enter the second state. After the terminal receives the state indication information, the terminal may determine what the corresponding state identifier is and what state the terminal should enter according to whether the target information indication field exists in the state indication information.

For example, when the target information indication field is used for indicating the "state identifier" to the terminal, the target information indication field may be referred to as the "state indication field"; when the target information indication field is used for indicating the "behavior level indication" to the terminal, the target information indication field may be referred to as the "behavior level indication field"; when the target information indication field is used for indicating the "indication about whether first indication information is required to be received" to the terminal, the target information indication field may be referred to as the "first indication information receiving indication field" . . . . It is to be understood that what are given here are merely possible names of the target information indication field in specific state indication scenarios and are not intended to limit the name of the target information indication field.

In scheme (4), the state indication information may contain a target information indication field. In scheme (5), no matter which target state the base station desires the terminal to enter, the state indication information carries a target information indication field, but the target information indication field carries different information in the case of a different indicated target state. For example, in an example of this embodiment, if the terminal detects that information carried in the target information indication field is "0", then it is indicated that the terminal needs to enter the first state; if the terminal detects that information carried in the target information indication field is "1", then it is indicated that the terminal needs to enter the second state.

Among the five schemes of manner one, the terminal can directly determine, according to the content of the state indication information, the state identifier indicated by the base station. The following describes another scheme in which the terminal determines, according to the sending situation of the state indication information, the state indicated by the base station.

Manner two: The terminal acquires indication information according to the sending situation of the state indication information. Optionally, the terminal may determine the indication information in any one of the manners below.

(6) The terminal acquires the indication information according to a sending port of the state indication information.

(7) The terminal acquires the indication information according to the number of sending ports of the state indication information.

(8) The terminal acquires the indication information according to a sending time-domain resource of the state indication information.

(9) The terminal acquires the indication information according to a sending frequency-domain resource of the state indication information.

For scheme (6), the terminal and the base station may agree that sending ports of the state indication information are divided into multiple groups, where different groups correspond to different states. For example, group A corresponds to a first state, and group B corresponds to a second state. The terminal determines, according to a correspondence between different port groups and different states, whether the received state indication information is used for instructing the terminal needing to enter the first state or used for instructing the terminal needing to enter the second state. If the terminal detects that the sending port of the state indication information belongs to group A, the terminal knows that the state indication information is used for instructing the terminal to enter the first state. If the terminal detects that the sending port of the state indication information belongs to group B, the terminal knows that the state indication information is used for instructing the terminal to enter the second state.

In scheme (7), the base station determines the number of sending ports of the state indication information according to the target state that needs to be indicated to the terminal, where different numbers of sending ports correspond to different states. For example, one sending port corresponds to a first state, and two sending ports correspond to a second state. In this case, the terminal may determine, according to a correspondence between numbers of sending ports and states, whether the received state indication information is used for instructing the terminal to enter the first state or used for instructing the terminal to enter the second state. If the terminal detects that the number of sending ports of the state indication information is 1, the terminal knows that the state indication information is used for instructing the terminal to enter the first state. If the terminal detects that the number of sending ports of the state indication information is 2, the terminal knows that the state indication information is used for instructing the terminal to enter the second state.

In scheme (6) and scheme (7), the base station selects the sending port based on the target state that the state indication information indicates the terminal to enter, thereby indicating the target state to the terminal. However, in scheme (8) and scheme (9), the base station may indicate the target state to the terminal through at least one of the sending time-domain resource or the sending frequency-domain resource of the state indication information. That is, different at least ones of the sending time-domain resource or the sending frequency-domain resource correspond to different states. For example, it is assumed that the base station and the terminal agree that if the terminal detects the state indication information on a first type of time-domain resource, then it is indicated that the base station instructs the terminal to enter the first state; if the terminal detects the state indication information on a second type of time-domain resource, then it is indicated that the base station instructs the terminal to enter the second state. In this manner, after the terminal receives the state indication information, the terminal may determine, according to the time-domain resource on which the state indication information is received, the state indicated by the base station.

Undoubtedly, the nine schemes provided in the preceding manner one and manner two are applicable to not only the determination of the state identifier, but also the determination of at least one of the "behavior level indication", "indication about whether first indication information is required to be received", "receiving indication related to the first indication information" or another indication information.

It is to be understood that since a total of nine schemes are provided in the preceding manner one and manner two, for the terminal and the base station, different pieces of indication information may be indicated in these nine manners at most. For example, the base station and the terminal agree that the state identifier is indicated through scheme (1), the behavior level indication is indicated through scheme (2), and the indication about whether first indication information is required to be received is indicated through scheme (3) . . . . In this way, the base station may configure the state indication information in the corresponding manner and then sends the configured state indication information to the terminal in the corresponding sending manner. After the terminal receives the state indication information sent by the base station, the terminal may determine, according to the various content carried in the state indication information or the various sending situations of the state indication information, the various indication information indicated by the base station and then enter, according to the indication of these pieces of indication information, the target state desired by the base station.

Some other indication manners are described below. These indication manners are directed at a BWP index, a carrier index, a timer, a counter, an RNTI contained in a receiving indication related to first indication information and used for blind detecting the first indication information, etc.

Directed at a BWP Index

When the base station configures the state indication information, the base station sets a "BWP indication field" in the state indication information and indicates, through the value of this field, to the terminal on which BWPs a state transition needs to be performed. This field may indicate, through a bitmap, to the terminal whether the state transition needs to be performed on each candidate BWP. Each bit in the BWP bitmap corresponds to a respective candidate BWP. If m candidate BWPs are provided, this field may be m bits. If a certain bit in the BWP bitmap is set to "0", then it is indicated that the state transition does not need to be performed on the candidate BWP corresponding to this bit. If this bit is set to "1", then it is indicated that the state transition needs to be performed on the candidate BWP corresponding to this bit.

The so-called candidate BWP here may be predefined by the system or semi-statically configured by the base station. For example, the candidate BWP may be an activated BWP.

Directed at a Carrier Index

When the base station configures the state indication information, the base station sets a "carrier indication field" in the state indication information and indicates, through the value of this field, to the terminal on which carriers a state transition needs to be performed. This field may indicate, through a bitmap, to the terminal whether the state transition needs to be performed on each candidate carrier. Each bit in the carrier bitmap corresponds to a respective candidate carrier. If m candidate carriers are provided, this field may be m bits. If a certain bit in the carrier bitmap is set to "0", then it is indicated that the state transition does not need to be performed on the candidate carrier corresponding to this bit. If this bit is set to "1", then it is indicated that the state transition needs to be performed on the candidate carrier corresponding to this bit.

The so-called candidate carrier here may be predefined by the system or semi-statically configured by the base station. For example, the candidate carrier may be an activated carrier.

Directed at a Timer

Method 1: When the base station configures the state indication information, the base station sets a "timer field" in the state indication information. Different values of this field are used for indicating the items below.

(1) The value of this field is used for indicating whether to start a certain particular timer. For example, it is assumed that the value of the "timer field" in the state indication information is "0", then it is indicated that the base station instructs the terminal not need to start timer 1; if the value of the "timer field" is "1", then it is indicated that the base station instructs the terminal to start timer 1.

(2) The value of this field is used for indicating the value of a certain timer. For example, if the "timer field" is "00", the base station instructs the terminal to start timer 1, and the timing threshold (also referred to as the upper limit of timing) of timer 1 is T1 timing units; if the "timer field" is "01", the base station instructs the terminal to start timer 1, and the timing threshold of timer 1 is T2 timing units; if the "timer field" is "10", the base station instructs the terminal to start timer 1, and the timing threshold of timer 1 is T3 timing units; if the "timer field" is "11", the base station instructs the terminal to start timer 1, and the timing threshold of timer 1 is T4 timing units. T1, T2, T3 and T4 are integers, and the values of T1, T2, T3 and T4 may be predefined by the system or may be configured by the base station semi-statically or dynamically.

(3) The value of this field is used for indicating one of multiple timers. For example, if the "timer field" is "00", then it is indicated that the base station instructs the start of timer 1; if the "timer field" is "01", then it is indicated that the base station instructs the start of timer 1; if the "timer field" is "10", then it is indicated that the base station instructs the start of timer 3.

Method 2: The terminal determines whether to start a certain particular timer according to whether the state indication information is detected. If the state indication information is detected, the terminal starts the timer; if the state indication information is not detected, the terminal does not start the timer.

Directed at a Counter

Method 1: When the base station configures the state indication information, the base station sets a "counter field" in the state indication information. Different values of this field are used for indicating the items below.

(1) The value of this field is used for indicating whether to start a certain particular counter. For example, it is assumed that the value of the "counter field" in the state indication information is "0", then it is indicated that the base station instructs the terminal not need to start counter 1; if the value of the "counter field" is "1", then it is indicated that the base station instructs the terminal to start counter 1.

(2) The value of this field is used for indicating the value of a certain counter. For example, if the "counter field" is "00", the base station instructs the terminal to start counter 1, and the counting threshold (also referred to as the upper limit of counting) of counter 1 is T1 counting units; if the "counter field" is "01", the base station instructs the terminal to start counter 1, and the counting threshold of counter 1 is T2 counting units; if the "counter field" is "10", the base station instructs the terminal to start counter 1, and the counting threshold of counter 1 is T3 counting units; if the "counter field" is "11", the base station instructs the terminal to start counter 1, and the counting threshold of counter 1 is T4 counting units. T1, T2, T3 and T4 are integers, and the values of T1, T2, T3 and T4 may be predefined by the system or may be configured by the base station semi-statically or dynamically.

(3) The value of this field is used for indicating one of multiple counters. For example, if the "counter field" is "00", then it is indicated that the base station instructs the start of counter 1; if the "counter field" is "01", then it is indicated that the base station instructs the start of counter 1; if the "counter field" is "10", then it is indicated that the base station instructs the start of counter 3.

Method 2: The terminal determines whether to start a certain particular counter according to whether the state indication information is detected. If the state indication information is detected, the terminal starts the counter; if the state indication information is not detected, the terminal does not start the counter.

Method 3: The terminal determines whether to perform an increase operation or a decrease operation on a counter according to the number of times the state indication information is detected. For example, each time the terminal detects the state indication information, the counter is increased or decreased by 1; if the terminal detects no state indication information on a particular time-frequency resource, the state of the counter is not changed.

Directed at an RNTI Used in Blind Detecting the First Indication Information

The "RNTI used in blind detecting the first indication information" may be used for indicating which RNTI the terminal uses to perform blind detection or which RNTI the terminal uses to descramble a CRC bit when the terminal receives the state indication information. The RNTI may be any one of a Cell RNTI (C-RNTI), a Configured Scheduling RNTI (CS-RNTI), a System Information RNTI (SI-RNTI), a Paging RNTI (P-RNTI), a Slot Format Indicator RNTI (SFI-RNTI), an Interrupted Transmission Indication-RNTI (INT-RNTI) or a Random Access RNTI (RA-RNTI) or may be a new RNTI configured for a group of users.

In this embodiment, when the base station configures the state indication information, the base station may set an "RNTI indication field" in the state indication information. Different values of this field correspond to RNTIs used when the terminal performs blind detection or receives a state transition channel. For example, if the value of this field is "0", then it is indicated that the base station instructs the terminal to use the C-RNTI to blind detect the first indication information; if the value of this field is "1", then it is indicated that the base station instructs the terminal to use the RA-RNTI to blind detect the first indication information.

Embodiment Five

FIG. 6 shows a scheme as to how a terminal acquires, after receiving state indication information, various indication information according to the state indication information. It is to be understood that if a base station desire to indicate one or more of the preceding pieces of indication information to the terminal through the state indication information, the base station needs to configure the state indication information or send the state indication information in the corresponding manner. Referring to FIG. 7, FIG. 7 shows a flowchart of a state indication method performed by the base station.

In S702, state indication information is configured for a terminal.

If indication information that the base station desires to indicate to the terminal needs to be embodied by the content of the state indication information, the base station needs to configure the state indication information to carry information content capable of indicating corresponding indication information when configuring the state indication information.

For example, in an example, assuming that the base station needs to indicate an MCS of first indication information to the terminal through the state indication information, the base station may configure, for the terminal and in any one of the manners below, state indication information that carries information content capable of indicating the MCS of the first indication information.

In manner one, the base station may configure, for the terminal, state indication information that carries a sequence corresponding to the MCS of the first indication information. For example, the base station divides the available sequences of the state indication information into multiple groups, where different groups correspond to different MCSs. For example, group A corresponds to MCS 1 of the first indication information, and group B corresponds to MCS 2 of the first indication information. The base station determines which sequence is carried in the state indication information according to the MCS that needs to be notified to the terminal. If the base station indicates to the terminal that the MCS of the first indication information is MCS 1, the base station may carry sequence group A in the generated state indication information. If the base station indicates to the terminal that the MCS of the first indication information is MCS 2, the base station may carry sequence group B in the generated state indication information.

In manner two, the base station may configure, for the terminal, state indication information that carries a sequence whose generation parameter corresponds to the MCS of the first indication information. For example, the base station may divide the generation parameter values of the sequence of the state indication information into multiple groups in advance, where different groups correspond to different MCSs of the first indication information. For example, group A corresponds to MCS 1 of the first indication information, and group B corresponds to MCS 2 of the first indication information. The base station determines, according to the MCS that needs to be notified to the terminal, which type of sequence that generation parameter carried in the state indication information belongs to. If the base station indicates to the terminal that the MCS of the first indication information is MCS 1, the base station may carry, in the generated state indication information, a sequence whose generation parameter belongs to group A. If the base station indicates to the terminal that the MCS of the first indication information is MCS 2, the base station may carry, in the generated state indication information, a sequence whose generation parameter belongs to group B.

In manner three, the base station may configure, for the terminal, state indication information whose orthogonal cover code corresponds to the MCS of the first indication information. For example, the terminal and the base station divide the orthogonal cover codes of the state indication information into multiple groups, where different groups correspond to different states. For example, group A corresponds to MCS 1 of the first indication information, and group B corresponds to MCS 2 of the first indication information. The base station determines, according to the MCS that needs to be notified to the terminal, which type of orthogonal cover code of the state indication information is. If the base station indicates to the terminal that the MCS of the first indication information is MCS 1, the base station may configure, for the terminal, state indication information whose orthogonal cover code belongs to group A. If the base station indicates to the terminal that the MCS of the first indication information is MCS 2, the base station may configure, for the terminal, state indication information whose orthogonal cover code belongs to group B.

In manner four, the base station may determine whether an MCS indication field needs to be carried in the generated state indication information according to the MCS of the first indication information that needs to be indicated to the terminal and then generate the state indication information according to the determination result. For example, if the base station indicates to the terminal that the MCS of the first indication information is MCS 1, the base station may carry the MCS indication field in the state indication information; if the base station indicates to the terminal that the MCS of the first indication information is MCS 2, the base station may configure state indication information not carrying the MCS indication field. The terminal may determine the MCS of the first indication information according to whether the state indication information carries the MCS indication field.

In manner five, the base station may determine, according to the MCS of the first indication information that needs to be indicated to the terminal, information contained in the MCS indication field in the state indication information and then generate the state indication information according to the determination result. For example, if the base station indicates to the terminal that the MCS of the first indication information is MCS 1, the base station may set the value of the MCS indication field in the state indication information to "0"; if the base station indicates to the terminal that the MCS of the first indication information is MCS 2, the base station may set the value of the MCS indication field in the state indication information to "1".

In S704, the state indication information is sent to the terminal.

After the base station configures the state indication information, the base station may send the state indication information to the terminal. It is to be understood that in this embodiment, the state indication information configured by the base station may be at least one of a state transition signal or a state transition channel. In other words, the base station may carry the state indication information to the terminal through the state transition signal, may carry the state indication information to the terminal through the state transition channel, or may carry the state indication information to the terminal through the state transition signal and the state transition channel.

In the preceding examples, a scheme is described in which the base station indicates corresponding indication information to the terminal through the content carried in the state indication information. A scheme is described below in which the base station indicates corresponding indication information to the terminal also through the state indication information. A description is given below using an example in which the indication information indicated by the base station to the terminal is also the MCS of the first indication information.

Manner one: The base station selects a port corresponding to the MCS of the first indication information to send the state indication information to the terminal. For example, the base station divides the sending ports of the state indication information into multiple groups, where different groups correspond to different MCSs. For example, group A corresponds to MCS 1 of the first indication information, and group B corresponds to MCS 2 of the first indication information. The base station determines, according to the MCS that needs to be notified to the terminal, which port is used in sending the state indication information. If the base station indicates to the terminal that the MCS of the first indication information is MCS 1, the base station may send the state indication information to the terminal through a port in group A. If the base station indicates to the terminal that the MCS of the first indication information is MCS 2, the base station may send the state indication information to the terminal through a port in group B.

Manner two: The base station sends the state indication information to the terminal through ports, where the number of the ports corresponds to the MCS of the first indication information. For example, the base station determines, according to the MCS that needs to be indicated to the terminal, the number of ports used in sending the state indication information, where different numbers of sending ports correspond to different MCSs. For example, one sending port corresponds to MCS 1 of the first indication information, and two sending ports correspond to MCS 2 of the first indication information. The base station may determine, according to the MCS that needs to be notified to the terminal, the number of ports used in sending the state indication information. If the base station indicates to the terminal that the MCS of the first indication information is MCS 1, the base station may use one sending port in sending the state indication information. If the base station indicates to the terminal that the MCS of the first indication information is MCS 2, the base station may use two sending ports in sending the state indication information.

Manner three: The base station selects at least one of a sending time-domain resource or a sending frequency-domain resource corresponding to the MCS of the first indication information to send the state indication information to the terminal. For example, the base station determines, based on the MCS that needs to be indicated by the state indication information, at least one of the sending time-domain resource or the sending frequency-domain resource for the state indication information, where different at least ones of the sending time-domain resource or the sending frequency-domain resource correspond to different MCSs of the first indication information. For example, it is assumed that the base station and the terminal agree that if the terminal detects the state indication information on a first type of time-domain resource (for example, a symbol whose serial number is an odd number), then it is indicated that the MCS of the first indication information is MCS 1; if the terminal detects the state indication information on a second type of time-domain resource (for example, a symbol whose serial number is an even number), then it is indicated that the MCS of the first indication information indicated by the base station is MCS 2. Thus, if the base station indicates to the terminal that the MCS of the first indication information is MCS 1, the base station may send the state indication information by using the first type of time-domain resource; if the base station indicates to the terminal that the MCS of the first indication information is MCS 2, the base station may send the state indication information by using the second type of time-domain resource.

Embodiment Six

Figure 8:
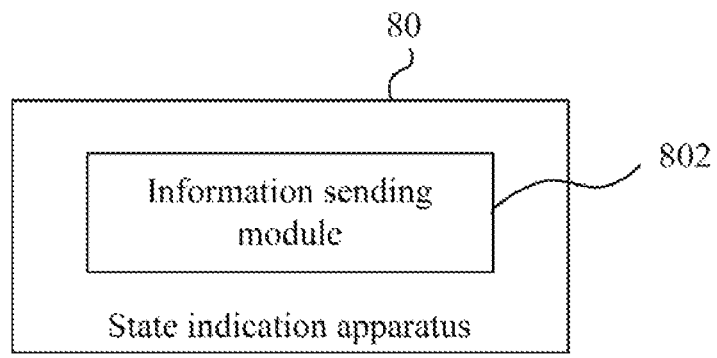
FIG. 8 is a schematic diagram illustrating a structure of a state indication apparatus according to embodiment six of the present disclosure.
Figure 9:
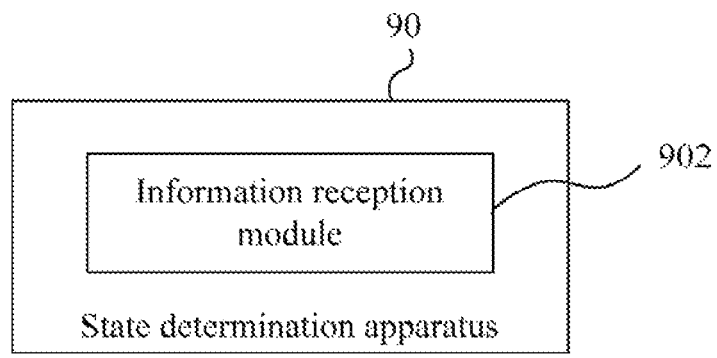
FIG. 9 is a schematic diagram illustrating a structure of a state determination apparatus according to embodiment six of the present disclosure.

This embodiment first provides a state indication apparatus and a state determination apparatus. Referring to FIGS. 8 and 9 respectively, FIG. 8 shows a structure of a state indication apparatus 80 and FIG. 9 shows a structure of a state determination apparatus 90.

The state indication apparatus 80 includes an information sending module 802. The information sending module 802 is configured to send state indication information to a terminal. A state transition of the terminal is indicated through the state indication information.

The state determination apparatus 90 includes an information reception module 902. The information reception module 902 is configured to receive state indication information sent by a base station.

In this embodiment, the state indication information is used for indicating at least one of the following indication information: a state identifier for indicating whether the terminal enters a first state or a second state; a frequency-domain resource index; a behavior level indication; an indication about whether first indication information is required to be received; a receiving indication related to the first indication information; a timer; a counter; a frame structure; or requiring receiving at least one of an association signal or an association channel.

In an example of this embodiment, the state indication information indicates the indication information in at least one of the following manners: indicating the indication information through a sequence carried in the state indication information; indicating the indication information through a generation parameter of the sequence in the state indication information; indicating the indication information through an orthogonal cover code of the state indication information; indicating the indication information through determining whether a target information indication field exists in the state indication information; indicating the indication information through information carried in the target information indication field of the state indication information; indicating the indication information through a sending port of the state indication information; indicating the indication information through the number of sending ports of the state indication information; indicating the indication information through a sending time-domain resource of the state indication information; or indicating the indication information through a sending frequency-domain resource of the state indication information.

In an example of this embodiment, the frequency-domain resource index includes at least one of a BWP index or a carrier index.

In an example of this embodiment, the behavior level indication is used for indicating one of a multiple behavior levels. The behavior levels include at least one of the following: a time-domain range in one of the first state or the second state; a frequency-domain range in one of the first state or the second state; determining whether at least one of a first downlink channel or a first downlink signal is required to be received; determining whether at least one of a first uplink channel or a first uplink signal is required to be sent; or a transmit power level supported in one of the first state or the second state.

At least one of the first downlink channel or the first downlink signal may include one of an SS, a PBCH, a CSI-RS, a PDCCH, an SIB 1, other SIBs, or paging.

At least one of the first uplink channel or the first uplink signal may include at least one of an SRS, a grant-free PUSCH or a DMRS.

In an example of this embodiment, the receiving indication related to the first indication information includes at least one of the following: a time-domain resource for receiving the first indication information; a frequency-domain resource for receiving the first indication information; receiving an MCS of the first indication information; or information about blind detecting the first indication information In an example of this embodiment, the frame structure is used for indicating at least one of the following: a transmission direction on N time units, where N is a positive integer; or a transmission direction on M frequency units, where M is a positive integer.

In an example of this embodiment, the information sending module 802 is further configured to send at least one of an association signal or an association channel on a target second time resource of a target first time resource. Correspondingly, the information reception module 902 is further configured to detect at least one of an association signal or an association channel on a target second time resource of a target first time resource after receiving the state indication information. The target first time resource is a first time resource where the state indication information is received. Alternatively, the target first time resource is an n-th first time resource after the first time resource where the state indication information is received, where n is a positive integer. The target second time resource is a second time resource where the state indication information is received. Alternatively, the target second time resource is an m-th second time resource after the second time resource where the state indication information is received, where m is a positive integer. The second time resource is any one of a subframe, a slot, a mini slot or an OFDM symbol.

In an example of this embodiment, if the information sending module 802 does not send the state indication information on a time-domain resource predefined by a system or configured by a base station, the latest sending of at least one of an association signal or an association channel is cancelled. Correspondingly, if the information reception module 902 does not receive the state indication information in a time-domain resource predefined by the system or configured by the base station, the latest detection of at least one of an association signal or an association channel is cancelled.

Figure 11:
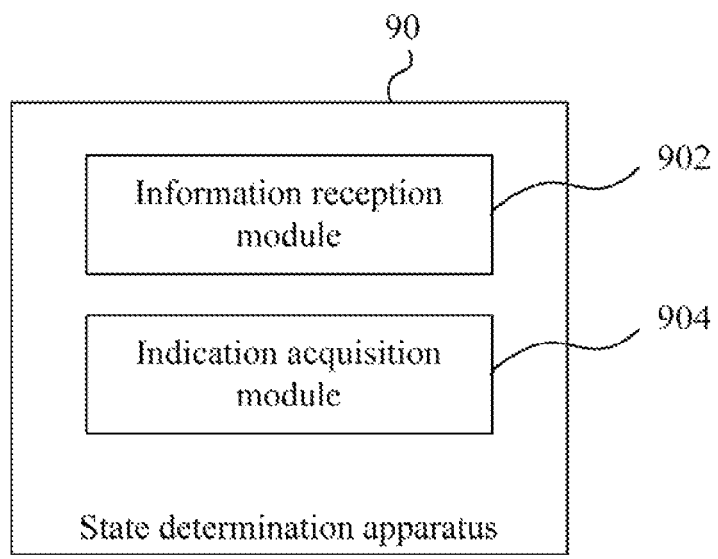
FIG. 11 is a schematic diagram illustrating another structure of a state determination apparatus according to embodiment six of the present disclosure.

In an example of this embodiment, a state determination apparatus is provided. FIG. 11 is a schematic diagram illustrating another structure of the state determination apparatus 90.

The state determination apparatus 90 further includes an indication acquisition module 904 in addition to the information reception module 902. The indication acquisition module 904 is configured to acquire, according to the state indication information, one or more types of indication information indicated by the state indication information. For the process in which the indication acquisition module 904 acquires various information indicated by the state indication information, see the description of the preceding embodiments. The details are not repeated here.

Figure 10:
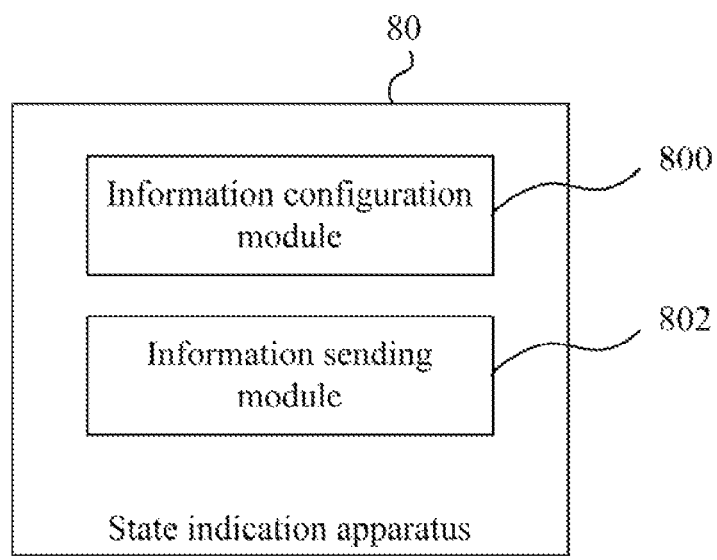
FIG. 10 is a schematic diagram illustrating another structure of a state indication apparatus according to embodiment six of the present disclosure.

In an example of this embodiment, a state determination apparatus is provided. FIG. 10 is a schematic diagram illustrating another structure of the state indication apparatus 80.

The state indication apparatus 80 includes an information configuration module 800 and an information sending module 802. The information configuration module 800 is configured to configure state indication information for a terminal. The information sending module 802 is configured to send the state indication information configured by the information configuration module 800 to the terminal in a corresponding manner. For the rules that the information configuration module 800 configures the state indication information and the principles that the information sending module 802 sends the state indication information, see the description of the preceding embodiments.

For details about how the state indication apparatus 80 performs the state indication method and how the state determination apparatus 90 performs the state determination method, see the description of the preceding embodiments. The details are not repeated here.

In this embodiment, the state indication apparatus 80 may be deployed on a base station, the functions of the information sending module 802 in the state indication apparatus 80 may be implemented by the communication unit of the base station, and the functions of the information configuration module 800 may be implemented by the processor of the base station. In this embodiment, the state determination apparatus 90 may be deployed on a terminal, the functions of the information reception module 902 in the state determination apparatus 90 may be implemented by the communication unit of the terminal, and the functions of the indication acquisition module 904 may be implemented by the processor of the terminal.

Additionally, this embodiment further provides a storage medium. The storage medium may store one or more computer programs that can be read, compiled and executed by one or more processors. In this embodiment, the storage medium may store one of a state indication program or a state determination program. The one or more processors can execute the state indication program to perform any one state indication method described in the preceding embodiments. The one or more processors can execute the state determination program to perform any one state determination method described in the preceding embodiments.

Figure 12:
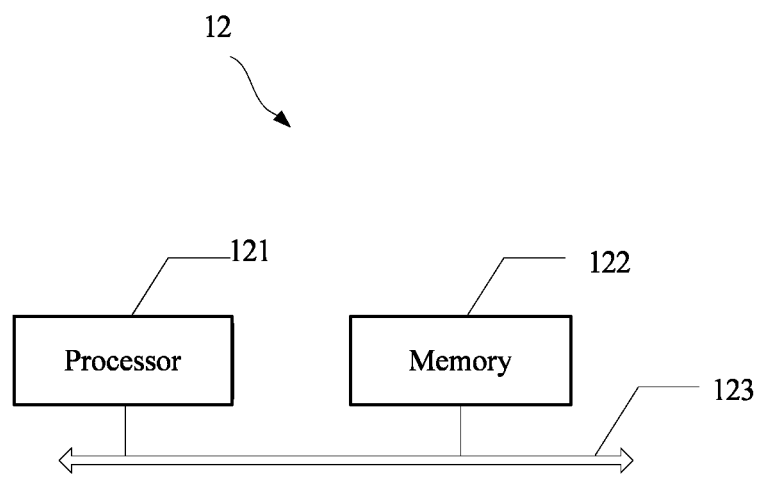
FIG. 12 is a schematic diagram illustrating a hardware structure of a communication device according to embodiment six of the present disclosure.

This embodiment further provides a communication device. As shown in FIG. 12, a communication device 12 includes a processor 121, a memory 122, and a communication bus 123 configured to connect the processor 121 and the memory 122. The memory 122 may be the preceding storage medium storing at least one of the state indication program or the state determination program.

If the state indication program is stored in the memory 122, the processor 121 may read the state indication program, compile the state indication program, and execute the state indication program to perform the steps of the state indication method described in any one of the preceding embodiments. The communication device 12 may be a base station. For details about how the communication device 12 performs the state indication method, see the description of the preceding embodiments. The details are not repeated here.

If the state determination program is stored in the memory 122, the processor 121 may read the state determination program, compile the state determination program, and execute the state determination program to perform the steps of the state determination method described in any one of the preceding embodiments. The communication device 12 may be a terminal. For details about how the communication device 12 performs the state determination method, see the description of the preceding embodiments. The details are not repeated here.

Figure 13:
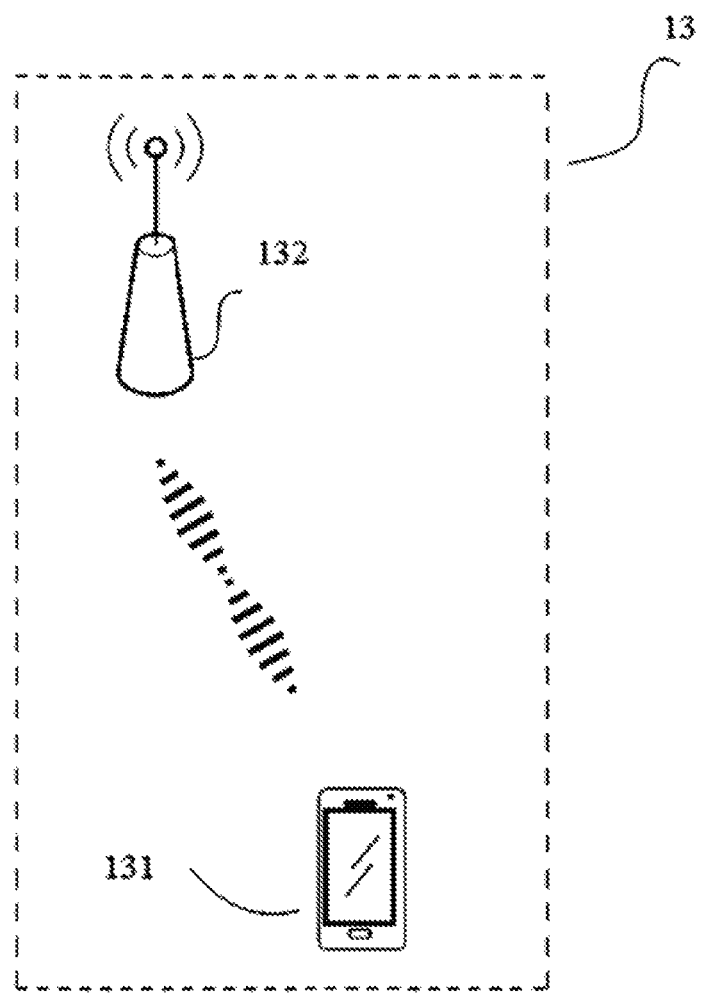
FIG. 13 is a schematic diagram of a communication system according to embodiment six of the present disclosure.

This embodiment further provides a communication system. Referring to FIG. 13, a communication system 13 includes a terminal 131 and a base station 132. The terminal 131 may be the communication device of FIG. 10 in which the processor can execute the state determination program to perform the steps of the state determination method. The base station 132 may be the communication device of FIG. 10 in which the processor can execute the state indication program to perform the steps of the state indication method.

In the communication system provided in this embodiment of the present disclosure, the base station can send the state indication information to the terminal. The state indication information can indicate one or more types of the preceding various indication information to the terminal so that the terminal can enter a corresponding state according to the received state indication information. On the basis of schemes in the related art, the state of the terminal is controlled more flexibly, facilitating the balance between the energy consumption and communication efficiency of the terminal.

It is to be understood by those skilled in the art that the state determination method and apparatus, the state indication method and apparatus, the terminal, the base station, and the storage medium provided in embodiments of the present disclosure can be applicable not only to a 5G communication system, but also to any future communication system.

In the present disclosure, if not in collision, the features of the embodiments may be combined with each other and used in the same embodiment.

Apparently, it is to be understood by those skilled in the art that all or some of the steps of the preceding disclosed methods and at least one of function modules or function units in the preceding disclosed system and apparatuses may be implemented as software (implementable by program codes executable by a computing device), firmware, hardware, or an appropriate combination thereof. In a hardware implementation, the division of at least one of the function modules or the function units above may not correspond to the division of physical components. For example, one physical component may have multiple functions, or one function or step may be performed jointly by multiple physical components. Some or all physical components may be implemented as software executed by processors such as central processing units, digital signal processors or microprocessors, may be implemented as hardware, or may be implemented as integrated circuits such as application-specific integrated circuits. Such software may be distributed on a computer-readable medium and executed by a computing device. Moreover, in some cases, the steps illustrated or described herein may be performed in a different order from the order described herein. Computer-readable media may include computer storage media (or non-transitory media) and communication media (or transitory media). As is known to those having ordinary skill in the art, the term computer storage media include volatile and nonvolatile media and removable and non-removable media implemented in any method or technology for storing information (such as computer-readable instructions, data structures, program modules or other data). The computer storage medium includes, but is not limited to, a random access memory (RAM), a read-only memory (ROM), an electrically erasable programmable read only memory (EEPROM), a flash memory or other memory technologies; a compact disc read-only memory (CD-ROM), a digital versatile disk (DVD) or other optical disk memories; a magnetic cassette, a magnetic tape, a disk memory or other magnetic storage devices, or any other medium used for storing desired information and accessed by a computer. Moreover, it is known to those having ordinary skill in the art that the communication medium usually includes computer-readable instructions, data structures, program modules or other data in modulated data signals such as carriers or other transmission mechanisms and may include any information delivery medium. Therefore, the present disclosure is not limited to any particular combination of hardware and software.

The preceding is a more detailed description of embodiments of the present disclosure in conjunction with implementations, and the specific implementations of the present disclosure cannot be construed as being limited to the description.

What is claimed is:

1. A wireless communication method, comprising:
receiving, by a user device from a base station, information including (1) state indication information that indicates a target state of the user device, the target state being a second state in which power consumption is greater than power consumption in a first state, and (2) a frequency-domain resource information indicating a frequency-domain resource to be used by the user device to enter the second state; and
performing, by the user device, a first operation to enter the target state based on the information, and
wherein the information further includes a first indication indicating that additional information is to be received by the user device, the first indication related to a blind detecting of the additional information, and
wherein, in responsive to the first indication, the user device performs a second operation to receive the additional information.

2. The wireless communication method of claim 1, wherein the information is carried in a pre-determined channel.

3. The wireless communication method of claim 1, wherein the state indication information indicates the target state using a state identifier indicating that the user device enters the second state.

4. The wireless communication method of claim 1, wherein the frequency-domain resource information includes at least one of a bandwidth part (BWP) index or a carrier index.

5. A wireless communication method, comprising:
transmitting, by a base station and to a user device, information including (1) state indication information that indicates a target state of the user device, the target state being a second state in which power consumption is greater than power consumption in a first state, and (2) a frequency-domain resource information indicating a frequency-domain resource to be used by the user device to enter the second state, and
wherein the information further includes a first indication indicating that additional information is to be received by the user device, the first indication related to a blind detecting of the additional information, and
wherein, in responsive to the first indication, the base station further transmits the additional information to the user device.

6. The wireless communication method of claim 5, wherein the information is carried in a pre-determined channel.

7. The wireless communication method of claim 5, wherein the state indication information indicates the target state using a state identifier indicating whether the user device enters the second state.

8. The wireless communication method of claim 5, wherein the frequency-domain resource information includes at least one of a bandwidth part (BWP) index or a carrier index.

9. A communication device comprising one or more processors and a memory, wherein the one or more processors are configured to:
    receive, from a base station, information including (1) state indication information that indicates a target state of the communication device, the target state being a second state in which power consumption is greater than power consumption in a first state, and (2) a frequency-domain resource information indicating a frequency-domain resource to be used by the communication device to enter the second state; and
    perform a first operation to enter the target state based on the information, and
    wherein the information further includes a first indication indicating that additional information is to be received by the communication device, the first indication related to a blind detecting of the additional information, and
    wherein, in responsive to the first indication, the communication device performs a second operation to receive the additional information.

10. The communication device of claim 9, wherein the information is carried in a pre-determined channel.

11. The communication device of claim 9, wherein the state indication information indicates the target state using a state identifier indicating whether the communication device enters the second state.

12. The communication device of claim 9, wherein the frequency-domain resource information includes at least one of a bandwidth part (BWP) index or a carrier index.

13. A communication device comprising one or more processors and a memory, wherein the one or more processors are configured to:
    transmit, to a user device, information including (1) state indication information that indicates a target state of the user device, the target state being a second state in which power consumption is greater than power consumption in a first state, and (2) a frequency-domain resource information indicating a frequency-domain resource to be used by the user device to enter the second state, and
    wherein the information further includes a first indication indicating that additional information is to be received by the user device, the first indication related to a blind detecting of the additional information, and
    wherein, in responsive to the first indication, the communication device further transmits the additional information to the user device.

14. The communication device of claim 13, wherein the information is carried in a pre-determined channel.

15. The communication device of claim 13, wherein the state indication information indicates the target state using a state identifier indicating whether the user device enters the second state.

16. The communication device of claim 13, wherein the frequency-domain resource information includes at least one of a bandwidth part (BWP) index or a carrier index.

* * * * *